Patented Jan. 21, 1947

2,414,640

UNITED STATES PATENT OFFICE 2,414,640

WEED KILLER

Herbert G. M. Fischer, Westfield, N. J., assignor to Standard Oil Development Company, a corporation of Delaware No Drawing. Application October 9, 1941, Serial No. 414,313

5 Claims. (Cl. 167—45)

This invention relates to a composition of matter for the destruction and prevention of the growth of weeds or other vegetation and also for the prevention of dust and the washing and erosion effect of rainfall along highway shoulders, railway embankments, river banks, aviation fields, etc.

It is known that various petroleum products have the property of "scorching" vegetation and thereby temporarily disposing of weeds and the like. This is shown by the effects on the roadside when spraying with conventional road oils, gas oils, etc. This effect on vegetation is only temporary and after a short period of time the vegetation again begins to grow and may even penetrate through an asphaltic crust. This is probably best exemplified in the Mississippi River revetment work where weeds have been known to force their way through the asphaltic mat. The phenomenon is first observed by heaving and cracking of the asphalt, thereafter the weeds penetrate and continue to grow above the asphalt surface.

It is an object of this invention to provide a weed killing composition which will permanently dispose of vegetation in any desired area by first killing the vegetation and seeds which may be present in the soil and thereafter to protect the area against reseeding by providing an impervious surface.

It is a still further object to provide a material which will not be displaced from the desired area by water such as might occur in case of a heavy rainstorm shortly after application.

These and other objects are achieved by selection of materials which are heavier than water and thereby are not easily floated off and secondly the materials have the property of preferentially wetting soil particles, thereby causing them to firmly adhere to the soil even under conditions of extreme moisture.

According to this invention hydrocarbon materials having an aromatic nature that have the property of destroying vegetation and of preventing seeds treated with this material from germination are used. In its preferred form, these compositions contain asphaltic matter which has a high specific gravity, is of sufficient high softening point to form a hard crust, and preferably be unsaturated in nature so that it will be readily oxidized on long exposure to the atmosphere. To the above material is added a solvent which serves two functions, first it liquefies the asphaltic material thereby aiding in application of the material, and secondly due to lowering of the viscosity causes penetration of the soil to a sufficient depth to act upon the roots of the plants and upon plant seeds which may be imbedded in the top surface of the soil. In order to be effective, this solvent should be aromatic in nature such as the solvents obtained by treating kerosene with a selective solvent such as $SO_2$, furfural, phenol and the like, or it may be obtained from coal tar distillation. The more highly aromatic the solvent material, the more effective it will be in fluidizing the asphalt and in destroying vegetation. Preferably this solvent is not too volatile, otherwise it will be dissipated before it has completed its full function.

As an example of one form of application of my invention, a densely weeded area was sprayed with a composition composed of a Venezuelan asphalt having a softening point of approximately 120° F. to which was added an equal portion of a solvent extract having an initial boiling point of 400° F., a final boiling point of 570° F. and an A. P. I. gravity of 21.3 in the proportion of approximately ½ gallon per square yard. Observations shortly after the application indicated that the vegetation was being destroyed and after one month, further observation indicated that with a very few exceptions the area had been well covered and the vegetation destroyed. Nine months later the area was again inspected and it was found that there had been no further growth of vegetation, that the surface was covered with an asphaltic crust which had prevented reseeding of the area from the surrounding densely weeded area.

As a further example of the application of my process, a densely weeded area was treated with a material similar to the above and thereafter an asphalt mat was placed over the treated area to simulate the revetment work on the Mississippi River. After several months there was no indication that the vegetation under the mat was beginning to grow. In untreated areas the vegetation has penetrated a similar asphalt mat.

While it is possible to obtain satisfactory results when using ordinary asphalt of suitable characteristics together with highly aromatic solvents, it is preferred to use as an asphaltic base, materials which are obtained by reducing cracking coal tars which have been produced under conditions of severe cracking to the desired physical specifications. Cracking coal tars having a softening point of 115° to 150° F. are suitable and may be obtained when operating on gas oil at high temperatures and pressures or the so-called vapor phase tars in which highly aromatic gasoline is produced is satisfactory. The more aromatic in type the asphaltic material is, the better will be the results obtained. Since aromaticity also indicates high specific gravity in the tar, these more aromatic tars will provide a finished material which will more easily resist water displacement.

The solvent should be one of a fairly high boiling range so that little evaporation takes place and most of the solvent is absorbed by the earth, thus sterilizing the soil to a considerable depth. A low viscosity oil would be readily absorbed. On the other hand, if a solvent with too high boiling point were employed, the asphaltic crust would not harden. The mixture preferred is a slow curing type.

Wetting agents, such as metallic soaps of naphthenic acids, fatty acids or glycerides and primary amines or diamines of more than 8 carbon atoms to the molecule may be used.

Inspections of the components used in a weed killer as well as the inspections of the final product are given below:

|  | Reduced C. C. tar | $SO_2$ extract topped to 500° F. I. B. P. | Blend, 50% topped extract, 50% red. C. C. tar |
|---|---|---|---|
| Specific gravity | 1.092 | .9745 | 1.033. |
| Pen. at 77° F | 60 |  | Furol at 77° F.—50 secs. |
| S. P | 118° F | I. B. P.—508° F |  |
| Flash | 450 | F. B. P.—613° F |  |
| Ductility | 100+ |  |  |

The proportions of asphalt and solvent may be varied, that is, 35% to 65% of the asphalt may be used with 65% to 35% of the solvent. Higher percentages of solvent are used when a deeper penetration of the soil is desired. On new constructions it is desirable to use a composition containing about 60% of the asphalt and 40% of the solvent to avoid the growth of vegetation due to the presence of weeds in the adjacent area. Sometimes it is desirable to use two applications, the first application containing the larger proportion of the solvent with a smaller proportion of the asphalt in order to obtain a deep penetration, after which a second treatment is used in which the proportion of asphalt is higher and the proportion of the solvent is lower in order that a sheet of asphalt or wearing coat is formed as for example, in the treatment of driveways, pavements, etc.

I claim:

1. A composition adapted to penetrate the soil and to form a hard crust upon the surface of the soil when applied in the amount of about one-half gallon per square yard of soil, which comprises about equal parts of reduced cracking coal tar having a specific gravity of about 1.092 and a softening point of about 120° F., and a light petroleum distillate of aromatic character, the distillate having an initial boiling point of about 400° F., a final boiling point of about 570° F. and an A. P. I. gravity of about 21.3.

2. A composition adapted to penetrate the soil and to form a hard crust upon the surface of the soil when applied in the amount of about one-half gallon per square yard of soil, which comprises about equal parts of reduced cracking coal tar having a specific gravity of about 1.092 and a softening point of about 120° F., and a solvent extract of kerosene, the extract having an initial boiling point of about 400° F., a final boiling point of about 570° F. and an A. P. I. gravity of about 21.3.

3. A composition adapted to penetrate the soil and to form a hard crust upon the surface of the soil when applied in the amount of about one-half gallon per square yard of soil, which comprises about equal parts of reduced cracking coal tar having a specific gravity of about 1.092 and a softening point of about 120° F., and a coal tar distillate, the distillate having an initial boiling point of about 400° F., a final boiling point of about 570° F. and an A. P. I. gravity of about 21.3.

4. A composition according to claim 1 containing a wetting agent.

5. The method of controlling the growth of weeds on a given area of soil, which comprises spraying the area with a composition having a specific gravity above about 1.0 to resist displacement of the composition by water and comprising about equal parts of reduced cracking coal tar having a specific gravity of about 1.092 and a softening point of about 120° F., and a light petroleum distillate of aromatic character, the distillate having an initial boiling point of about 400° F., a final boiling point of about 570° F. and an A. P. I. gravity of about 21.3, the composition being applied to the area in the amount of about one-half gallon of composition per square yard of area whereby it penetrates the soil to a sufficient depth to act upon the roots of the weeds and upon their seeds which may be imbedded in the top surface of the soil and the surface becomes covered with an asphaltic crust to prevent reseeding of the area.

HERBERT G. M. FISCHER.

Certificate of Correction

Patent No. 2,414,640.         January 21, 1947.

HERBERT G. M. FISCHER

It is hereby certified that errors appear in the printed specification of the above numbered patent requiring correction as follows: Column 2, lines 49 and 51; column 4, lines 3, 14, 25 and 38, for "coal" read *coil*; and that the said Letters Patent should be read with these corrections therein that the same may conform to the record of the case in the Patent Office.

Signed and sealed this 6th day of May, A. D. 1947.

[SEAL]

LESLIE FRAZER,
*First Assistant Commissioner of Patents.*